BEER CAN HANDLE

Filed Sept. 2, 1964 2 Sheets-Sheet 1

INVENTOR.
MICHAEL F. TALAY
BY
Walter Wenderoth Jr.
attorney

BEER CAN HANDLE
Filed Sept. 2, 1964 2 Sheets-Sheet 2
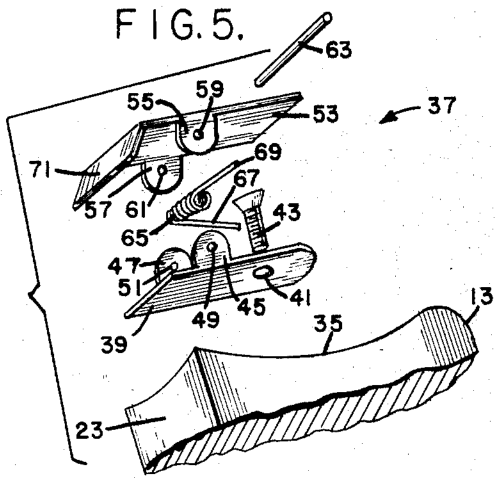
FIG. 5.
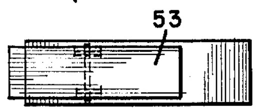
FIG. 2.
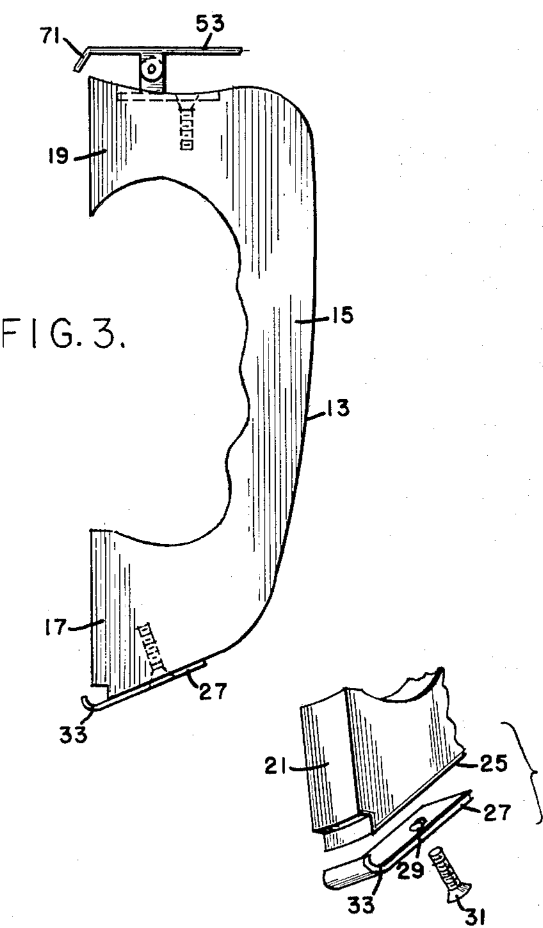
FIG. 3.
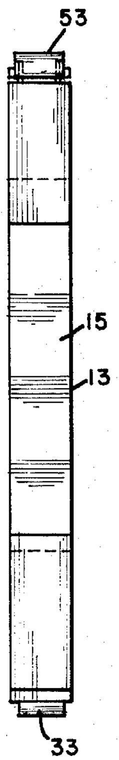
FIG. 4.
FIG. 6.
INVENTOR.
MICHAEL F. TALAY
BY
Walter J. Wessendorf Jr.
Attorney United States Patent Office 3,261,635

Patented July 19, 1966

3,261,635
BEER CAN HANDLE

Michael F. Talay, Catskill, N.Y., assignor of forty percent to Walter F. Wessendorf, Jr., Guilderland, N.Y.

Filed Sept. 2, 1964, Ser. No. 393,968
2 Claims. (Cl. 294—29)

This invention relates to an attachable and detachable handle for use with a conventional beer can.

The object of this invention is to provide a handle that is simple of construction and easy to manipulate for attachment and detachment to a beer can to facilitate the consumer's holding and movement of the beer can in drinking the contents.

This object and other objects of this invention should be appreciated from the detailed specification taken in conjunction with the drawings, wherein like reference numerals refer to similar parts throughout the several views, in which:

FIG. 2 is a top view of the handle;

FIG. 3 is a side view of the handle;

FIG. 4 is an end view of the handle;

FIG. 5 is a perspective assembly view showing the retainer assembly and a portion of the top of the handle;

FIG. 6 is a perspective assembly view showing the lower channel strap and a portion of the bottom of the handle.

Figure 1:
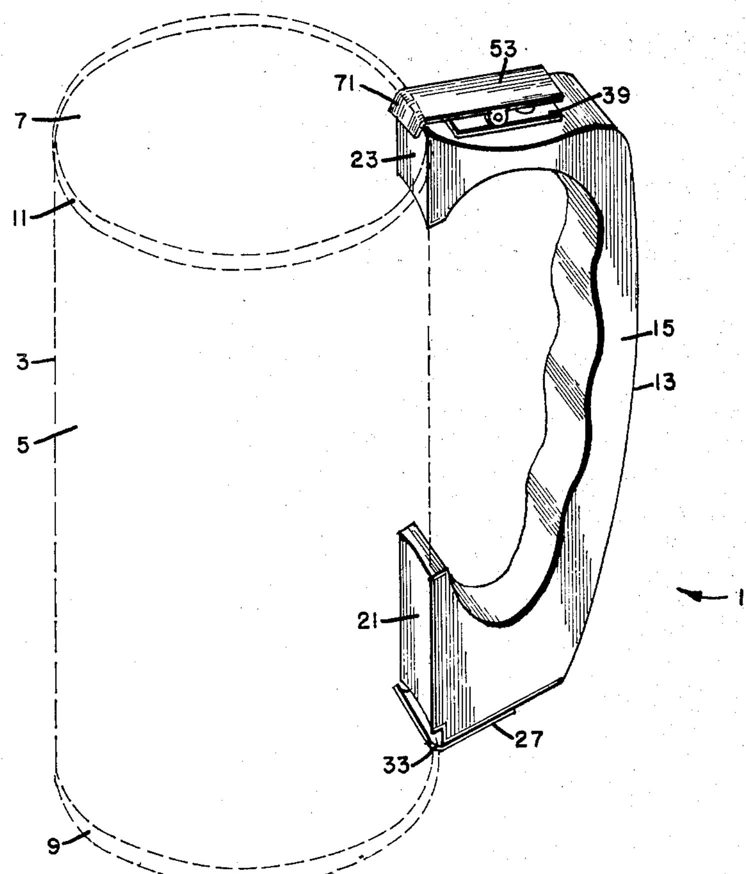
FIG. 1 is a perspective view of the handle shown attached to a conventional beer can that is shown in dashed lines.

In FIG. 1 of the drawings, reference numeral 1 generally refers to the invention attached to a conventional beer can 3 shown in dashed lines.

The conventional beer can or soda pop can 3 comprises a closed cylinder containing therein beer or soda pop. Can 3 comprises a cylindrical side wall 5, a lower end wall (not shown), an upper end wall 7, a lower rim or bead 9 and an upper rim or bead 11. The consumer provides himself access to the contents of can 3 by appropriate manipulation of a conventional can opener whose cutting member is of triangular shape to cut an opening or openings in the upper end wall 7, or by appropriate manipulation of an electric can opener to cut the upper end wall 7 adjacent to its upper rim or bead 11 for removal thereof.

The attachable and detachable beer can handle 13 is shown attached in FIG. 1 to can 3. Handle 13 is generally of D-shaped configuration and has a handle grip portion 15 configured comfortable to the hand to facilitate positive gripping and retention by the consumer of the handle grip portion 15. Handle 13 has an integral lower flange portion 17 and an integral upper flange portion 19 which are structurally configured, as viewed in FIG. 1, with slight convex portions 21 and 23, respectively, in the direction of handle grip portion 15. These convex portions 21 and 23 are complemental to the configuration of cylindrical side wall 5 such that when handle 13 is attached to can 3, convex portions 21 and 23 will be in abutting relationship against the contiguous arcuate portions of cylindrical side wall 5 thereby providing frictional engagement therewith for positive positional placement of handle 13 relative to can 3. In the preferred embodiment of the handle 13, as thus far described, the handle is made of plastic or other suitable material.

Disposed on the bottom 25 of handle 13 is a lower channel strap 27 carried thereon by strap 27 having a hole 29 formed therethrough, and through which hole 29 a screw 31 is disposed and engaged with a tapped hole in the bottom 25 thereby providing securement. Strap 27 has a lower channel portion 33 formed at a terminal end and configured complemental to receive in abutting relationship any arcuate portion of rim or bead 9 where channel portion 33 is positioned. It is within the concept of this invention to provide and form strap 27 and channel portion 33 as an integral part of handle 13.

Disposed on the top 35 of handle 13 is a retainer assembly 37 whose flat strap 39 is carried thereon by strap 39 having a hole 41 formed therethrough, and through which hole 41 a screw 43 is disposed and engaged with a tapped hole in the top 35 thereby providing securement. Integral tabs 45 and 47 upstanding from the lateral edges of strap 39 have respective holes 49 and 51 transversely formed therethrough.

Pivotally mounted on strap 39 is a retainer 53 from whose lateral edges depend integral tabs 55 and 57 having respective holes 59 and 61 transversely formed therethrough. Disposition of cross pin 63 through aligned holes 49, 51, 59 and 61 pivotally mounts retainer 53 relative to strap 39. Mounted on cross pin 63 intermediate tabs 45 and 47 is a spring 65 whose tail portions 67 and 69 engage the upper side of flat strap 39 and lower side of retainer 53, respectively, and thereby constraining retainer 53 to counterclockwise movement, as viewed in FIG. 1. At a terminal end of retainer 53, a retainer channel portion 71 is disposed angularly downward.

Detachment of handle 13 from can 3 follows the reverse steps of attachment. The consumer attaches handle 13 to can 3 by first disposing lower channel portion 33 in complemental relationship with lower rim or bead 9, then depressing and holding retainer 53 against the return action of spring 65, next moving convex portions 21 and 23 into complemental relationship with side wall 5 and finally releasing retainer 53 in such manner that retainer channel portion 71 engages upper rim or bead 11.

It is within the concept of this invention to substitute a wire-like compression spring fixed to the lower side of retainer 53 and imbedded in the top 35 of handle 13 for flat strap 39, screw 43, cross pin 63 and spring 65.

Having thusly described my invention, I claim:

1. A detachable beer can handle for use with a conventional beer can comprising a cylindrical side wall, lower rim or bead, and upper rim or bead; said handle being D-shaped and comprising a top, a bottom, a handle grip portion, lower flange portion, upper flange portion, lower channel portion, retainer channel portion and spring; said handle grip portion being configured comfortable to a consumer's hand for gripping same, said lower and upper flange portions being integral with said handle grip portion and having convex portions for disposition in frictional, complemental abutting relationship with portions of a cylindrical side wall of a can, said lower channel portion being carried on said handle bottom and being structurally configured to receive a lower can rim or bead in complemental relationship therewith, said retainer channel portion being rotatably disposed on said handle top for retentive engagement with an upper can rim or bead, and said spring being disposed relative to said retainer channel portion and said handle top, and as disposed, said spring constraining and maintaining said retainer channel portion in such retentive engagement with an attached upper can rim or bead.

2. A detachable beer can handle in accordance with claim 1, wherein said retainer channel portion and spring are elements of a retainer assembly which includes a flat strap, a cross pin and a retainer, and wherein said handle top carries said flat strap, said flat strap and retainer carry said cross pin to pivotally mount said retainer relative to said flat strap, said retainer forms on one of its ends said retainer channel portion, said cross pin carries said spring, said spring has tail portions, and one of said spring tail portions engages said retainer and the other one of said spring tail portions engages said flat strap to constrain and maintain said retainer channel portion in such retentive engagement with an attached upper can rim or bead.

References Cited by the Examiner

UNITED STATES PATENTS

| | | | |
|---|---|---|---|
| 906,986 | 12/1908 | Anderson | 294—29 X |
| 2,905,500 | 9/1959 | Thombs | 294—29 X |

GERALD M. FORLENZA, *Primary Examiner.*

G. F. ABRAHAM, *Assistant Examiner.*